(12) United States Patent
Takezawa et al.

(10) Patent No.: US 11,372,973 B2
(45) Date of Patent: Jun. 28, 2022

(54) VIRUS DETECTION SYSTEM AND VIRUS DETECTION METHOD USING USB RELAY DEVICE

(71) Applicant: HITACHI, LTD., Tokyo (JP)

(72) Inventors: Kei Takezawa, Tokyo (JP); Takuma Nishimura, Tokyo (JP); Hideki Tonooka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 410 days.

(21) Appl. No.: 16/462,959

(22) PCT Filed: Jan. 15, 2018

(86) PCT No.: PCT/JP2018/000775
§ 371 (c)(1),
(2) Date: May 22, 2019

(87) PCT Pub. No.: WO2018/139230
PCT Pub. Date: Aug. 2, 2018

(65) Prior Publication Data
US 2020/0065488 A1 Feb. 27, 2020

(30) Foreign Application Priority Data
Jan. 30, 2017 (JP) .............................. JP2017-014535

(51) Int. Cl.
*G06F 21/56* (2013.01)
*G06F 13/40* (2006.01)
(Continued)

(52) U.S. Cl.
CPC ........ *G06F 21/561* (2013.01); *G06F 13/4022* (2013.01); *G06F 13/4282* (2013.01);
(Continued)

(58) Field of Classification Search
CPC .............. G06F 21/561; G06F 13/4022; G06F 13/4282; G06F 21/564; G06F 2213/0042;
(Continued)

(56) References Cited

U.S. PATENT DOCUMENTS 8,458,376 B1 * 6/2013 Chen ....................... G06F 1/266
710/19
2003/0212841 A1 * 11/2003 Lin ..................... G06F 13/4081
710/62
(Continued)

FOREIGN PATENT DOCUMENTS

JP 2008-252924 10/2008
JP 2009-211524 A 9/2009
(Continued)

OTHER PUBLICATIONS

Loe, Edwin Lupito et al. "SandUSB: An Installation-Free Sandbox for USB Peripherals." 2016 IEEE 3rd World Forum on Internet of Things (WF-IoT) (pp. 621-626). Dec. 1, 2016. (Year: 2016).*
(Continued)

*Primary Examiner* — Idriss N Alrobaye
*Assistant Examiner* — Henry W Yu
(74) *Attorney, Agent, or Firm* — Mattingly & Malur, PC

(57) ABSTRACT

A virus detection system uses a USB relay device that can support not only the use of USB mass storage but also the use of other USB devices such as a mouse. The USB relay device has a connection switching unit for switching a connection state between a first connector unit to which a USB client is connected and a second connector unit connected to a USB host controller. The virus detection system includes a virus check engine unit that performs a virus check of a file acquired from the USB client or the USB host controller via the USB relay device. On the basis of a result of the check by the virus check engine unit, the USB relay
(Continued)

device performs switching control of the connection state by the connection switching unit.

4 Claims, 8 Drawing Sheets

(51) Int. Cl.
  *G06F 13/42* (2006.01)
  *G06F 3/00* (2006.01)
  *G06F 13/14* (2006.01)
(52) U.S. Cl.
  CPC .... *G06F 21/564* (2013.01); *G06F 2213/0042* (2013.01); *G06F 2221/034* (2013.01)
(58) Field of Classification Search
  CPC ............. G06F 2221/034; G06F 21/562; G06F 21/567; G06F 3/00; G06F 13/14
  USPC ............... 710/15–16, 33, 62, 107, 110, 313; 370/360, 362; 726/22, 24
  See application file for complete search history.

(56) References Cited

U.S. PATENT DOCUMENTS

| 2006/0242686 | A1 | 10/2006 | Toda et al. | |
| 2010/0241875 | A1* | 9/2010 | Ishii | G06F 21/85 |
| | | | | 713/193 |
| 2015/0365237 | A1* | 12/2015 | Soffer | G06F 21/82 |
| | | | | 726/20 |
| 2016/0299865 | A1* | 10/2016 | Hetzler | G06F 21/567 |

FOREIGN PATENT DOCUMENTS

| JP | 2010-262335 A | 11/2010 |
| WO | 2004/075056 A1 | 9/2014 |

OTHER PUBLICATIONS

Takehisa et al., USB Hub against the Malicious USB Devices, IEICE Technical Report, Feb. 24, 2015, vol. 114, No. 489, pp. 61-66.
International Search Report of PCT/JP2018/000775 dated Mar. 20, 2018.

* cited by examiner

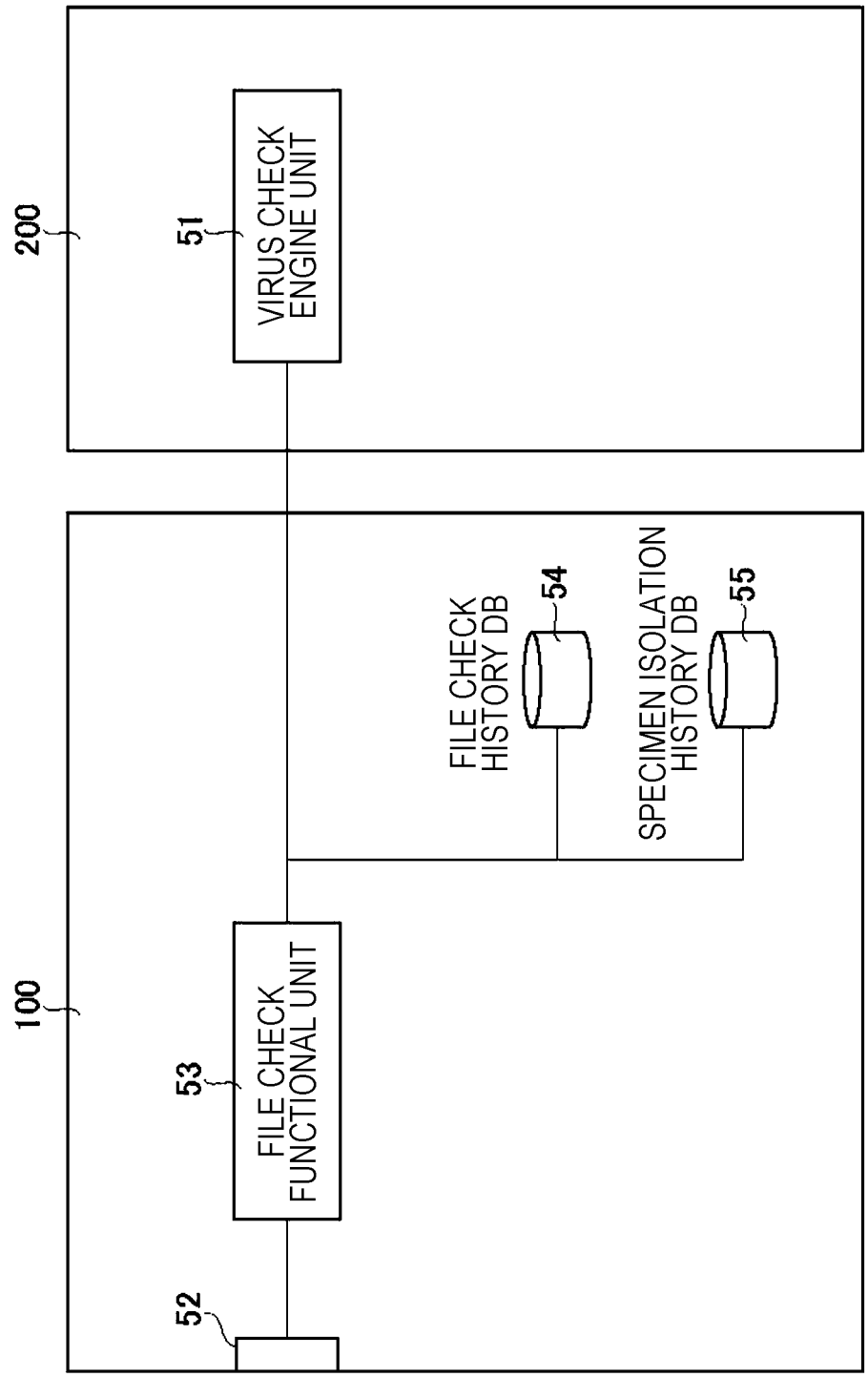

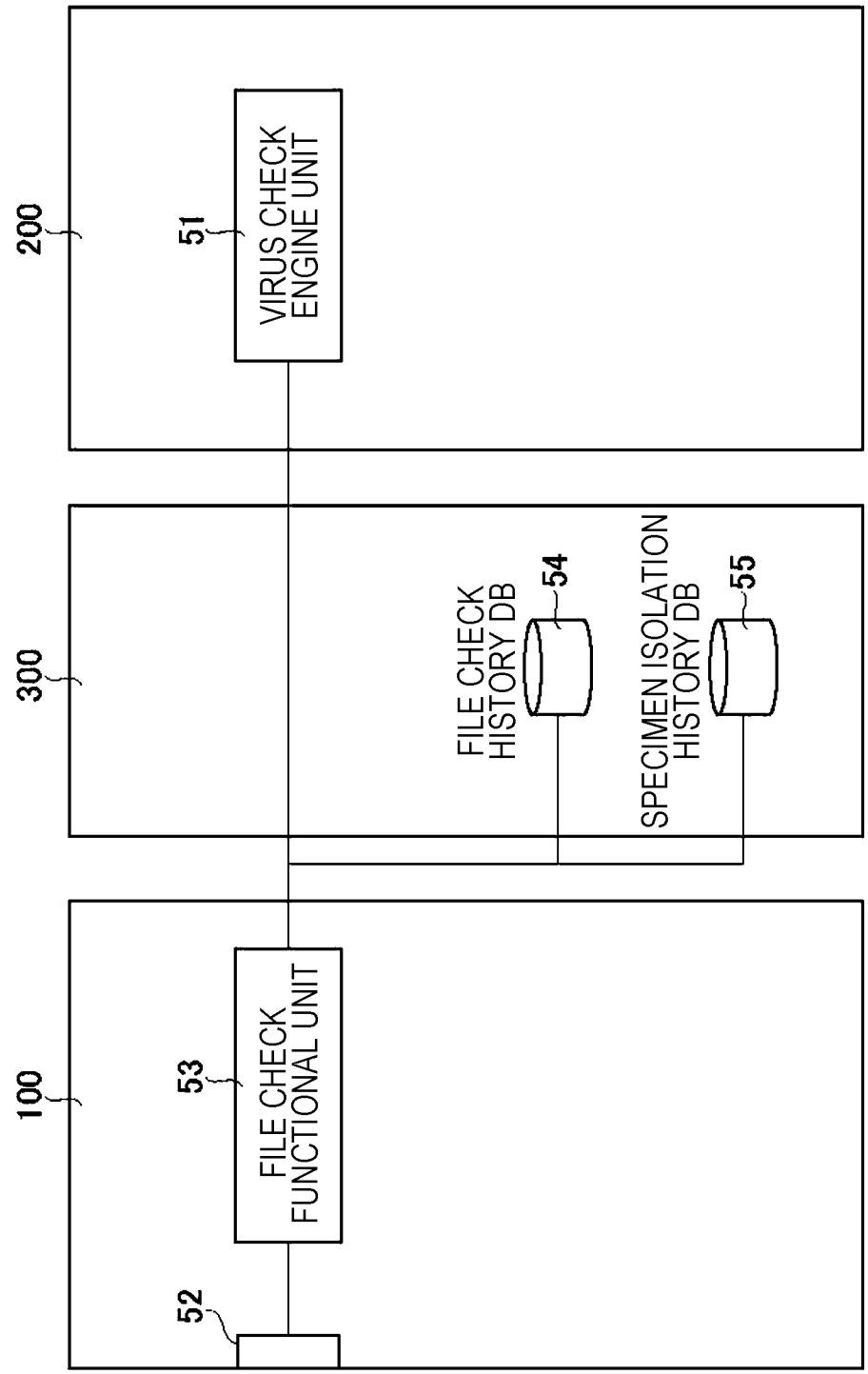

VIRUS DETECTION SYSTEM AND VIRUS DETECTION METHOD USING USB RELAY DEVICE

TECHNICAL FIELD

The present invention relates to a virus detection system and a virus detection method using a USB relay device.

BACKGROUND ART

USB mass storage is a major risk to various servers and computers. The risks are, for example, of information leakage by extraction of information, virus infection by intrusion of viruses, and others. For these risks, systematic measures are taken based on thorough operation management. For example, a device management software program is installed in each terminal to restrict the use of the USB mass storage, or an antivirus software program is installed in each terminal to check whether no viruses are mixed in files to be exchanged.

However, these software programs can be installed only in the corresponding operating system (OS) but cannot be applied to old computers, Internet of Things (IoT) devices or programmable logic controllers (PLCs) using dedicated OS. Further, in a computer used in a performance-designed system such as a control system, it is difficult to install additional software programs because performance will be affected by installation.

In this view, conventionally, a USB relay adapter device is used to connect to a USB memory with a relay of the device to execute a virus check of files in the adapter (refer to PTL 1). PTL 1 (for example, paragraph [0097]) states that "it is possible to reliably prevent a USB memory connected to a computer from becoming infected with data including a computer virus program infecting the computer".

CITATION LIST

Patent Literature

PTL 1: JP 2010-262335 A

SUMMARY OF INVENTION

Technical Problem

However, since the conventional technology described in PTL 1 is based on the exchange of files, the USB device capable of relaying is limited to USB mass storage. Therefore, while the USB relay adapter device described in PTL 1 is attached to the USB port of the computer, other USB devices such as keyboard, mouse, and printer cannot be used.

An object of the present invention is to provide a virus detection system and a virus detection method using a USB relay device capable of supporting not only the use of USB mass storage but also the use of other USB devices such as keyboard, mouse, and printer.

Solution to Problem

In order to achieve the foregoing object, the virus detection system of the present invention is a virus detection system using a USB relay device that has a connection switching unit configured to switch a connection state between a first connector unit to which a USB client is connected and a second connector unit connected to a USB host controller. The virus detection system includes a virus check engine unit that performs a virus check of a file acquired from the USB client or the USB host controller via the USB relay device. On the basis of a result of the check by the virus check engine unit, the USB relay device performs switching control of the connection state by the connection switching unit.

The virus detection method of the present invention in a virus detection system that uses a USB relay device having a connection switching unit configured to switch a connection state between a first connector unit to which a USB client is connected and a second connector unit connected to a USB host controller, includes: performing a virus check of a file acquired from the USB client or the USB host controller via the USB relay device; and based on a result of the virus check, performing switching control of the connection state by the connection switching unit.

Advantageous Effects of Invention

According to the present invention, it is possible to support not only the use of USB mass storage but also the use of other USB devices such as keyboard, mouse, and printer. In addition, since virus check is performed outside the USB relay device, only files exchanged between the USB client and the USB host controller can be subjected to virus check without impairing the versatility of the USB device.

BRIEF DESCRIPTION OF DRAWINGS

FIG. 7 is an example of a block diagram schematically illustrating a system configuration of a virus detection system according to an implementation form of a first modification example.

FIG. 8 is an example of a block diagram schematically illustrating a system configuration of a virus detection system according to an implementation form of a second modification example.

DESCRIPTION OF EMBODIMENT

Figure 1:
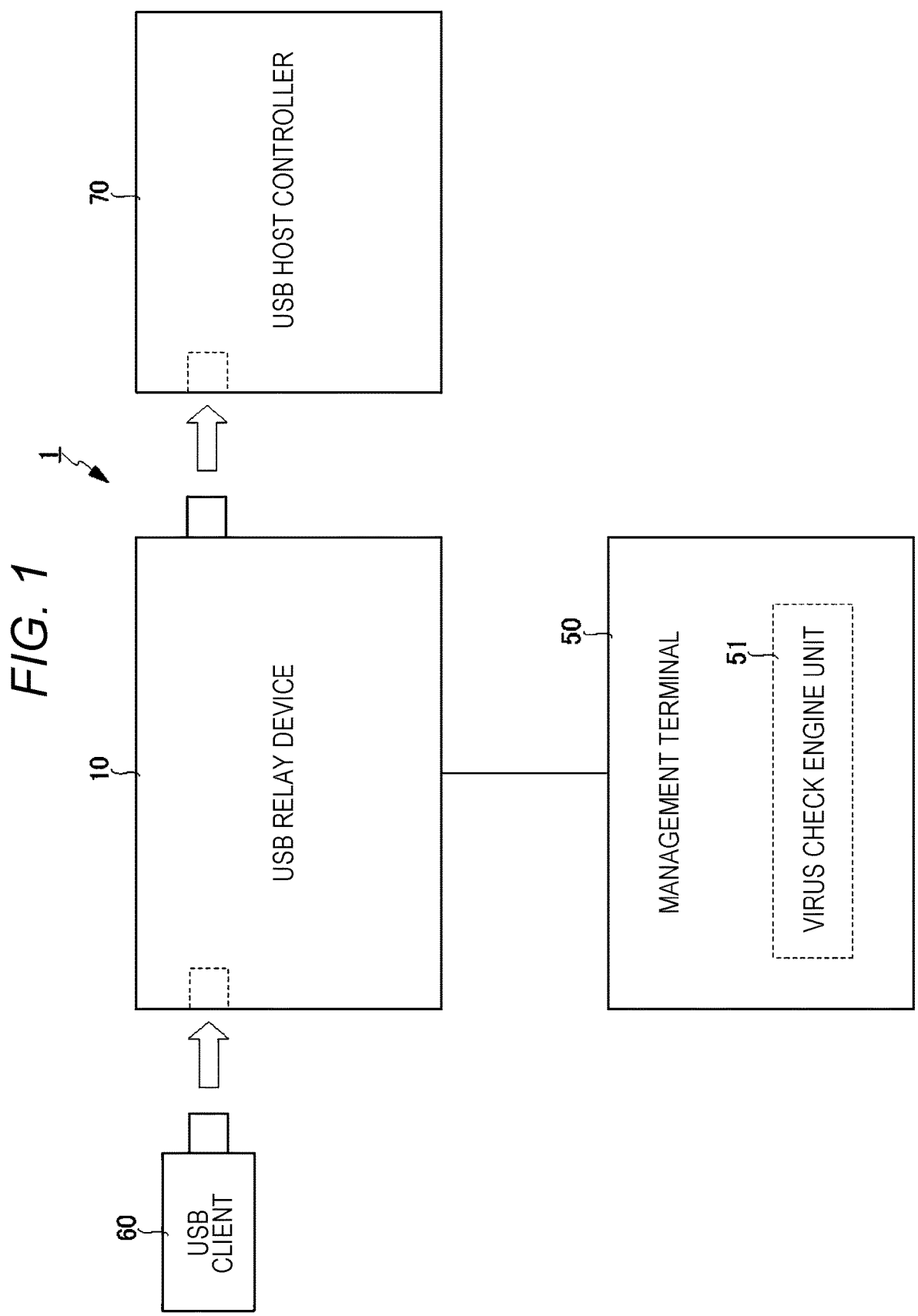
FIG. 1 is an example of a block diagram schematically illustrating a system configuration of a virus detection system according to an embodiment of the present invention.

Hereinafter, a mode for carrying out the present invention (hereinafter referred to as "embodiment") will be described in detail with reference to the drawings. The present invention is not limited to the embodiment. In the following description and drawings, the same reference numerals will be used for the same elements or elements having the same function, and redundant description will be omitted.

Regarding Usage Environment of the USB Relay Device

First, the use environment of the USB relay device used in the virus detection system according to the embodiment of the present invention will be described. As an example, descriptions will be given as to a case in which a USB host controller as a connection destination (relay destination) of the USB relay device used in the virus detection system according to the embodiment is a computer used in a performance-designed control system. Examples of the control system include a system for managing the operations of trains, a system for managing the operations of a power plant, and the like.

In this control system, there is a risk of the user connecting a USB mass storage (USB device) to a USB port of the computer as a USB client. Therefore, it is important to perform a virus check of files exchanged between the USB mass storage and the computer in order to prevent information leakage caused by extraction of information and virus infection caused by intrusion of virus, for example. For this end, a USB relay device is with a virus check function is attached (connected) as a device (for example, an adapter) for relaying the USB mass storage to the USB port of the computer.

Instead of the USB mass storage, other USB devices such as keyboard, mouse, and printer, for example, may be connected to the USB port of the computer. When the USB relay device is an adapter dedicated to exchange files, other USB devices such as keyboard, mouse, and printer, cannot be relayed. In other words, when the USB relay device is attached, USB devices other than the USB mass storage cannot be used. Therefore, the user needs to disconnect the USB relay device from the USB port of the computer and connects another USB device directly to the USB port of the computer.

In this way, when the USB relay device is an adapter dedicated to exchange files, the user needs to disconnect the USB relay device to use another USB device and re-connect the USB relay device to use the USB mass storage at some inconvenience to himself/herself. If the user forgets to re-attach the USB relay device to the USB port of the computer, for example, there are risks of information leakage caused by extraction of information and virus infection caused by intrusion of virus.

In order to eliminate the inconvenience for the user and the risks of virus infection caused by failing to attach the USB relay device and others, the USB relay device according to the present example supports the use of USB devices such as keyboard, mouse, and printer without making a change to the current system.

Specifically, the USB relay device according to the present example includes a connection switching (switching) unit for switching the connection state (path) between a first connector unit to which the USB client is connected and a second connector unit connected to a USB host controller. The connection switching unit is preferably a high-speed analog switch.

The performance-designed control system is taken here as an example of the usage environment of the USB relay device according to the present example. However, this is merely an example, and the present invention is not limited to this use environment. For example, the usage environment of the USB relay device may be a general OA system. That is, the USB relay device can be used as a relay device of a USB device (USB client) connected to a USB port of a computer (USB host controller) used in a general OA system as well as the performance-designed control system.

The USB relay device according to the present example can be used as an adapter. The USB relay device according to the present example makes it possible to securely use the USB mass storage while maintaining the versatility of the USB port. Hereinafter, descriptions will be given as to a virus detection system that uses a USB relay device supporting the use of USB devices such as keyboard, mouse, and printer without making a change to the current system.

Virus Detection System

FIG. 1 is an example of a block diagram schematically illustrating a system configuration of a virus detection system according to an embodiment of the present invention.

The virus detection system 1 according to the present embodiment includes a USB relay device 10 that relays connection of a USB client 60 to a USB host controller 70, and a management terminal 50 having a virus check engine unit 51. The virus check engine unit 51 performs a virus check of files acquired from the USB client 60 or the USB host controller 70 via the USB relay device 10. There is no particular limitation on the form of connection between the USB relay device 10 and the management terminal 50, and these elements may be connected in a wired or wireless manner.

Examples of the USB client 60 include USB mass storage, and USB devices such as keyboard, mouse, and printer. The USB host controller 70 can be a computer or the like used in a performance-designed control system as an example. Specific configurations of the USB relay device 10 and the management terminal 50 in the virus detection system 1 according to the present embodiment will be described below.

USB Relay Device

Figure 2:
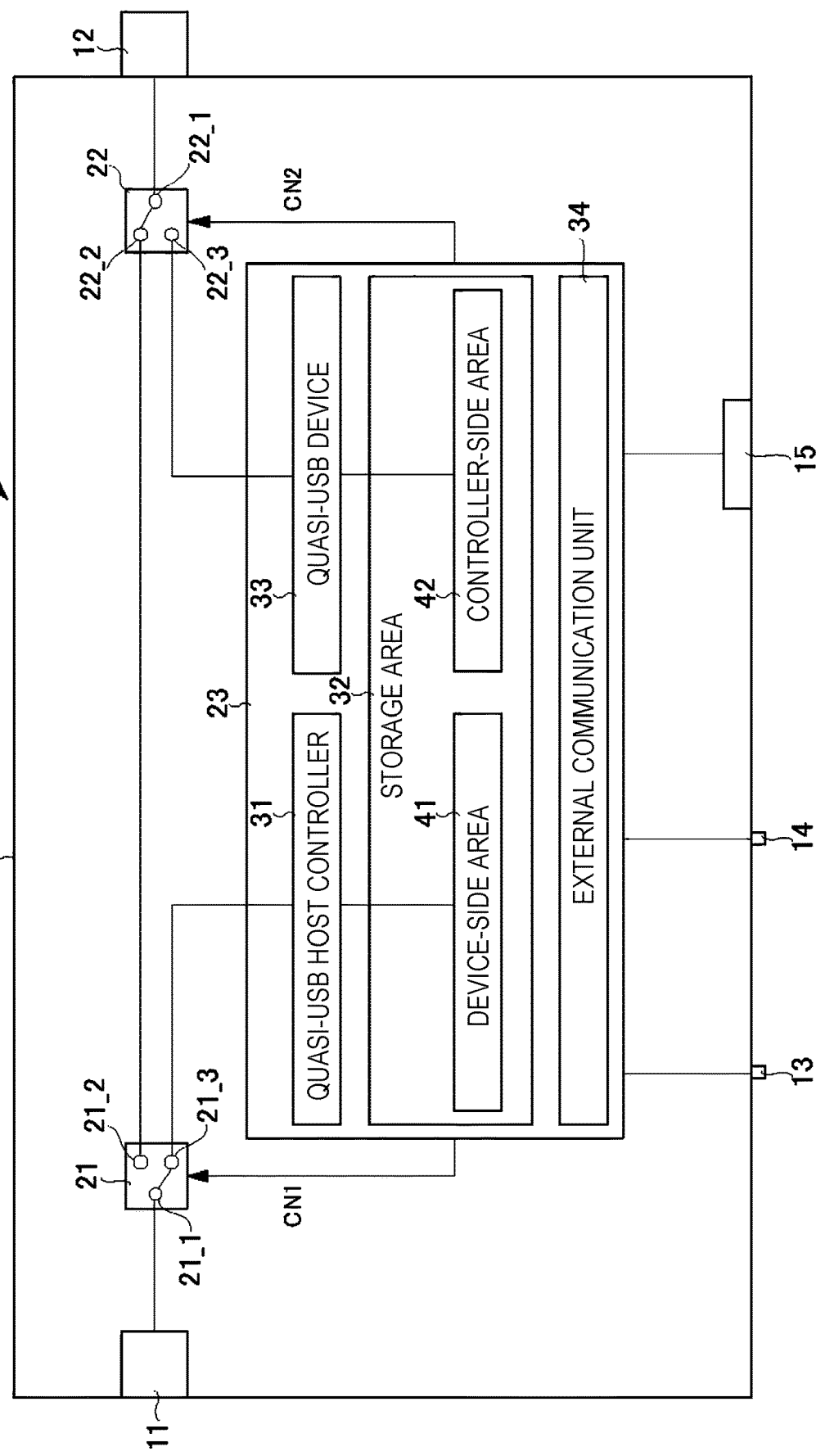
FIG. 2 is an example of a block diagram illustrating an example of a circuit configuration of a USB relay device.

FIG. 2 is an example of a block diagram illustrating an example of a circuit configuration of the USB relay device 10. As illustrated in FIG. 2, the USB relay device 10 includes a first connector unit 11, a second connector unit 12, a light emitting unit 13, a notification unit 14, and a communication interface 15 on the outer wall portion of a housing 16. The USB relay device 10 further includes a first switch unit 21, a second switch unit 22, and a control unit 23 inside the housing 16.

The first connector unit 11 is a female USB connector to which a USB client, for example, a USB mass storage or another USB device is connected. Another USB device is a device (device) such as keyboard, mouse, or printer, for example. The second connector unit 12 is a USB host controller, for example, a male USB connector connected to a USB port of a computer.

The light emitting unit 13 is formed from a light emitting diode (LED), for example, and notifies the user that a virus has been detected by turning on or blinking the LED. The notification unit 14 is formed from a speaker or a buzzer, for example, and notifies the user that a virus has been detected by outputting a notification sound from the speaker or sounding the buzzer. These notifications are executed under the control of the control unit 23. The communication interface 15 is an interface that communicates with the management terminal 50 in a wireless or wired manner.

The first switch unit 21 is formed from an analog switch having a movable contact 21_1 and two fixed contacts 21_2 and 21_3, and the movable contact 21_1 is electrically connected to the first connector unit 11. The fixed contact 21_2 is electrically connected to the second switch unit 22 (the fixed contact 22_2). The fixed contact 21_3 is electrically connected to the control unit 23.

The second switch unit 22 is formed from an analog switch having a movable contact 22_1 and two fixed contacts 22_2 and 22_3, and the movable contact 22_1 is electrically connected to the second connector unit 12. The fixed contact 22_2 of the second switch unit 22 and the fixed contact 21_2 of the first switch unit 21 are electrically connected to each other and the fixed contact 22_3 is electrically connected to the control unit 23.

The control unit 23 consists of a publicly known microcomputer including, for example, a central processing unit (CPU), a read only memory (ROM) for storing programs to be executed by the CPU, and a random access memory (RAM) used as a work area for the CPU. The control unit 23 internally has a quasi-USB host controller 31, a storage area 32, a quasi-USB device 33, and an external communication unit 34, and relays files input and output through the first connector unit 11 and the second connector unit 12. In addition, the control unit 23 performs switching control of the first switch unit 21 according to a switch control signal CN1 and performs switching control of the second switch unit 22 according to a switch control signal CN2.

The quasi-USB host controller 31 is one of functional units of the control unit 23, and is implemented by the CPU executing a general-purpose program stored in the ROM. The input end of the quasi-USB host controller 31 is electrically connected to the fixed contact 21_3 of the first switch unit 21.

The storage area 32 has a device-side area 41 and a controller-side area 42, and these areas are developed on the RAM.

The quasi-USB device 33 is one of functional units of the control unit 23, and is implemented by the CPU executing a general-purpose program stored in the ROM. The output end of the quasi-USB device 33 is electrically connected to the fixed contact 22_3 of the second switch unit 22.

The external communication unit 34 communicates with the management terminal 50 as an external device via the communication interface 15. Specifically, when the USB client 60 is connected to the first connector unit 11, the external communication unit 34 transmits management information obtained by reading from the USB client 60 to the management terminal 50. Examples of management information from the USB client 60 include a device ID, a serial ID, a USB relay device ID, and a file name. Further, the external communication unit 34 transfers the file input through the first connector unit 11 or the second connector unit 12 to the management terminal 50.

In the USB relay device 10 configured as described above, the first switch unit 21 and the second switch unit 22 constitute a connection switching unit that switches the connection state (path) between the first connector unit 11 and the second connector unit 12. The connection state between the first connector unit 11 and the second connector unit 12 consists of a first connection state in which the first switch unit 21 and the second switch unit 22 are electrically connected and a second connection state in which the control unit 23 is electrically connected to the first connector unit 11 and the second connector unit 12. In addition, out of the first connector unit 11 and the second connector unit 12, connecting only one connector unit to the control unit 23 and not connecting the other connector unit to the control unit 23 can bring about a disconnection state in which the first connector unit 11 and the second connector unit are not electrically connected to each other.

Management Terminal

Figure 3:
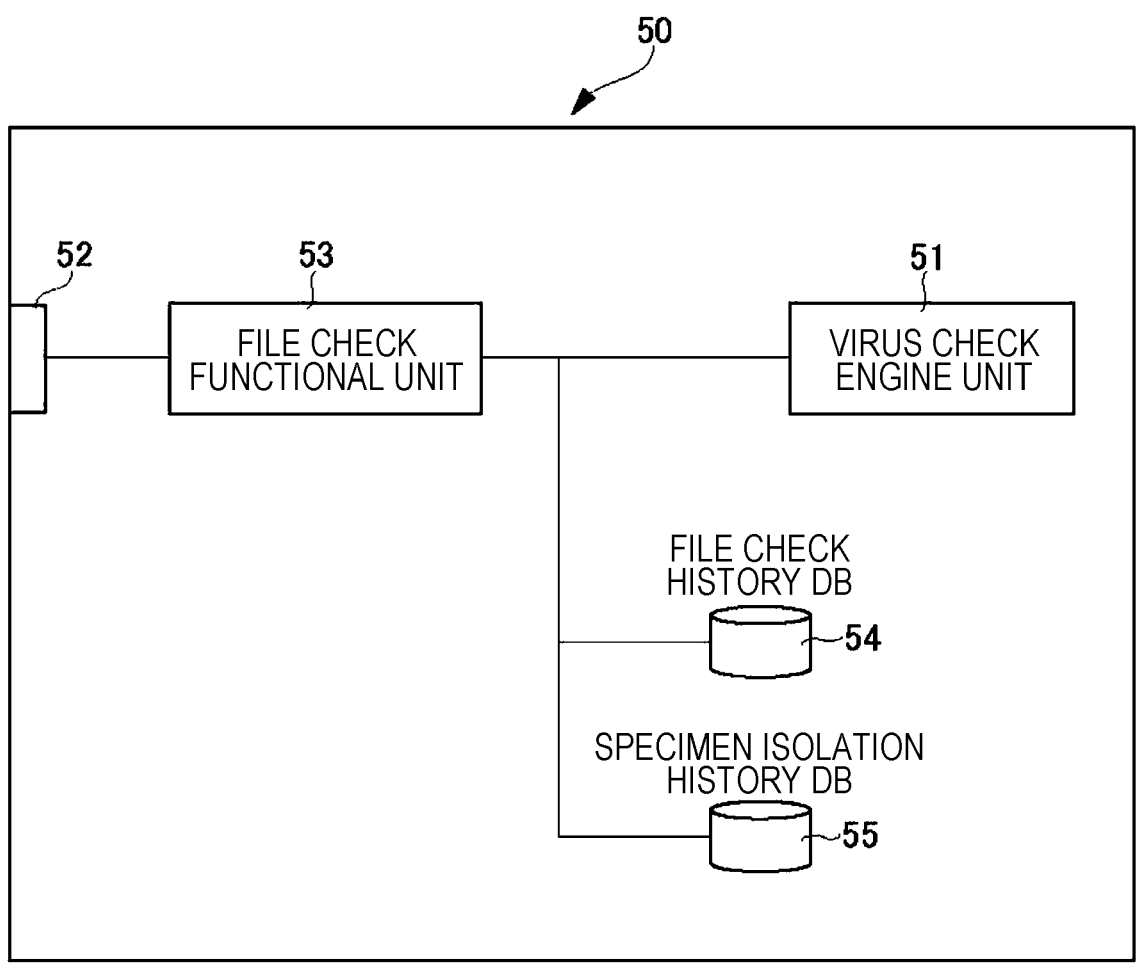
FIG. 3 is an example of a block diagram illustrating an example of a circuit configuration of a management terminal.

FIG. 3 is an example of a block diagram illustrating an example of a circuit configuration of the management terminal 50. As illustrated in FIG. 3, in addition to the virus check engine unit 51, the management terminal 50 includes, for example, a communication interface 52, a file check function unit 53, a file check history database (DB) 54, and a specimen isolation history database 55.

The virus check engine unit 51 can be formed from, for example, a known microcomputer having a CPU, a ROM for storing programs to be executed by the CPU, and a RAM used as a working area for the CPU. The communication interface 52 is an interface that communicates with the USB relay device 10 in a wireless or wired manner.

The file check function unit 53 can be formed from, for example, a known microcomputer having a CPU, a ROM for storing programs to be executed by the CPU, and a RAM used as a working area for the CPU. The file check function unit 53 acquires a file from the USB client 60 or the USB host controller 70 via the USB relay device 10 and transfers the same to the virus check engine unit 51 for virus check.

The file check function unit 53 further records check history information from the virus check engine unit 51 in the file check history database 54, records the file as a specimen, and registers the results of the virus check on the file in the specimen isolation history database 55.

Flow of Processing of Virus Detection Method

Subsequently, a flow of processing of the virus detection method in the virus detection system 1 according to the present embodiment configured as described above will be described with reference to the flowcharts of FIGS. 4, 5, and 6.

At the Time of Reading a File From USB Mass Storage

First, the processing at the time of reading a file from the USB mass storage will be described with reference to FIGS. 4 and 5.

Figure 4:
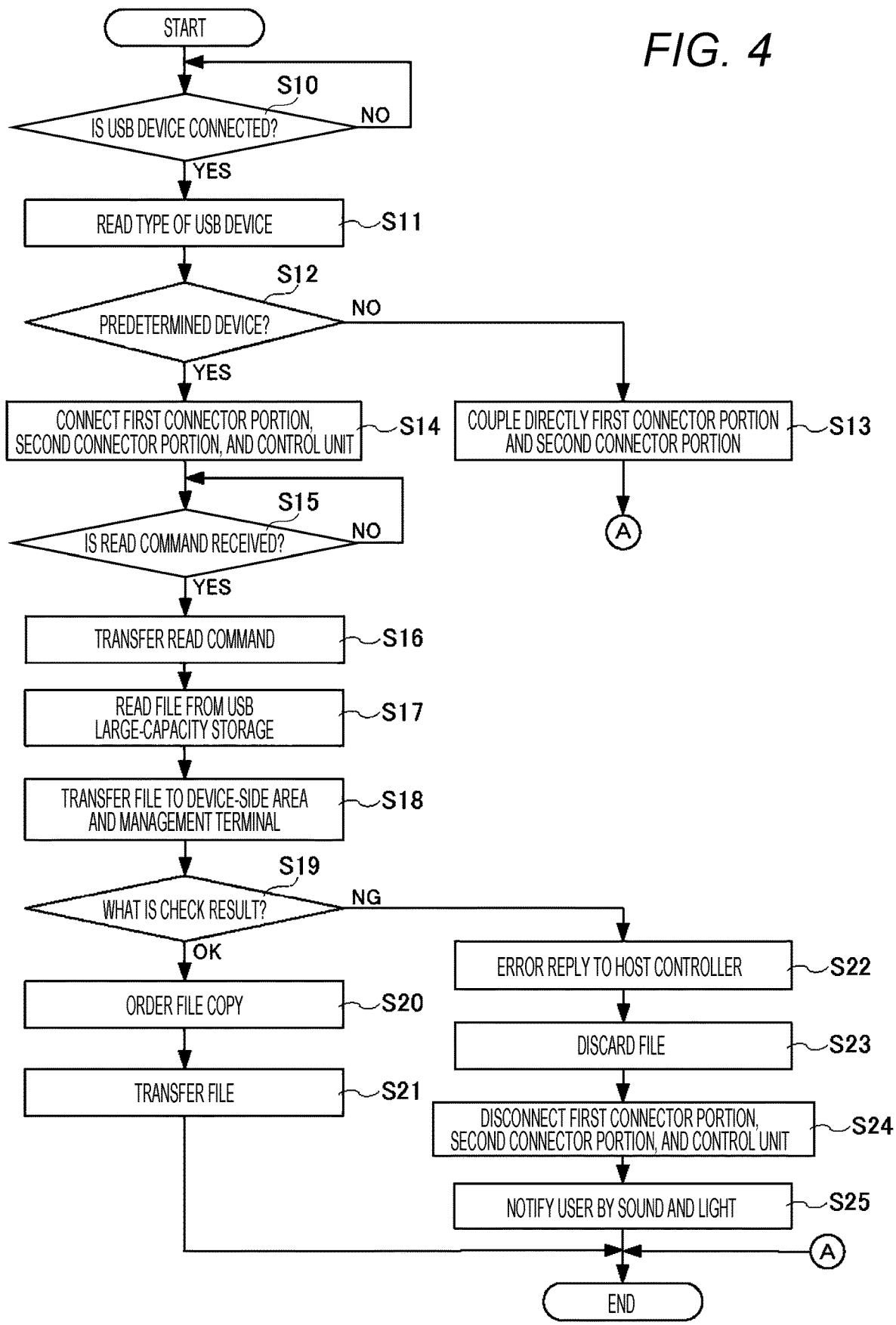
FIG. 4 is an example of a flowchart illustrating an example of processing by the USB relay device at the time of reading a file from a USB mass storage.
Figure 5:
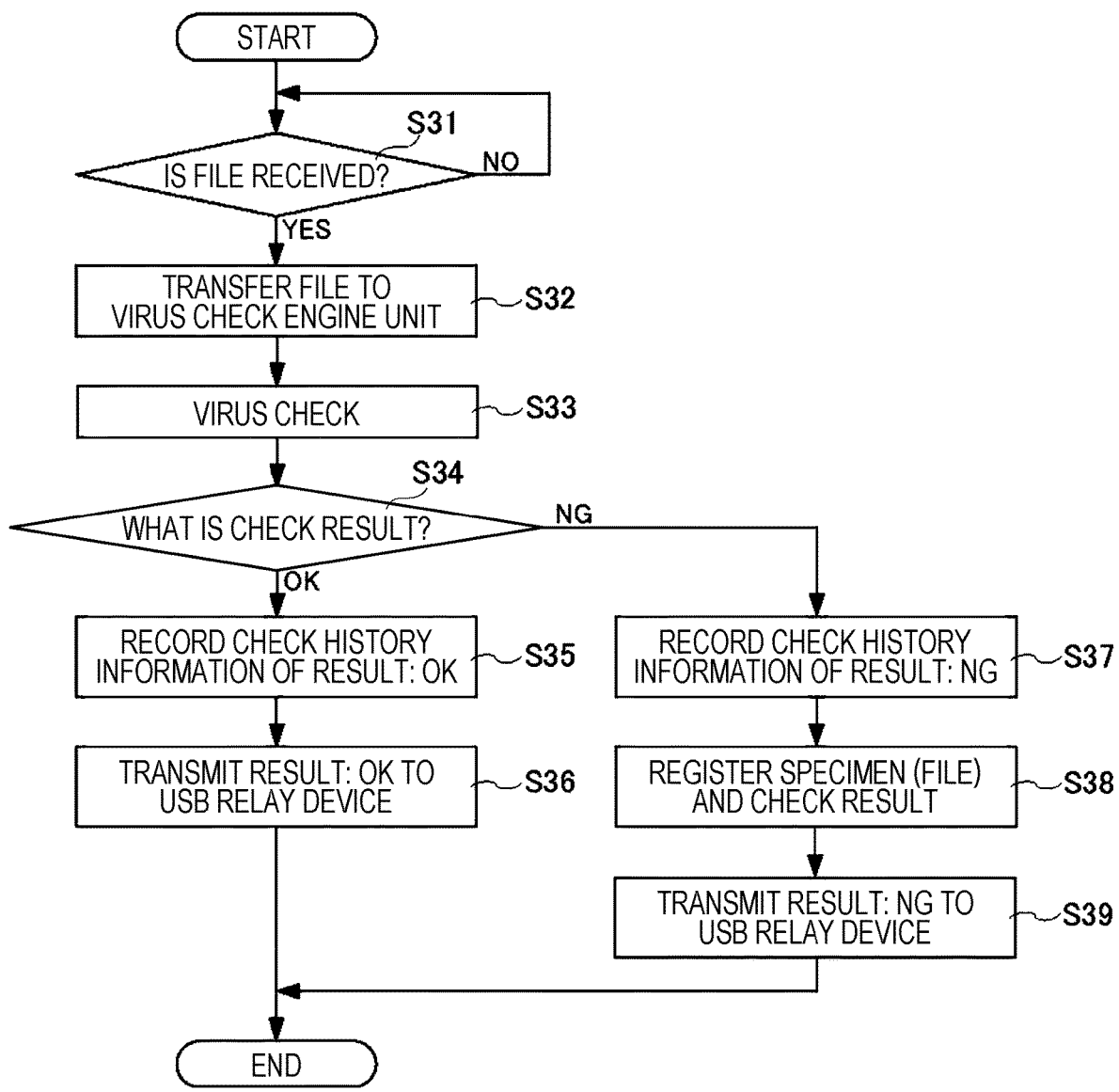
FIG. 5 is an example of a flowchart illustrating an example of processing by the management terminal at the time of reading a file from the USB mass storage (or at the time of writing a file to the USB mass storage).

FIG. 4 is an example of a flowchart illustrating an example of processing by the USB relay device 10 at the time of reading a file from the USB mass storage. This processing is executed under the control of functional parts of the control unit 23 in the USB relay device 10. FIG. 5 is an example of a flowchart illustrating an example of processing by the management terminal 50 at the time of reading a file from the USB mass storage. This process is executed under the control of the file check function unit 53 of the management terminal 50.

In the USB relay device 10, when the second connector unit 12 is connected to a USB port of a computer as an example of the USB host controller 70, power is supplied from the computer to the USB relay device 10 via the second connector unit 12. At this time, as illustrated in FIG. 2, the movable contact 21_1 of the first switch unit 21 is connected to the fixed contact 21_3, and the movable contact 22_1 of the second switch unit 22 is connected to the fixed contact 22_2. This state is the initial state of the USB relay device 10.

In this initial state, the first connector unit 11 and the second connector unit 12 are electrically disconnected from each other (the "disconnection state" described above). Therefore, even if a USB device as an example of a USB client is connected to the first connector unit 11 as a female USB connector, the computer is not electrically connected to the USB device, so security of the computer is maintained.

In this initial state, the quasi-USB host controller 31 of the control unit 23 monitors the connection of the USB device (the USB client 60) to the first connector unit (step S10), and when the USB device is connected, the quasi-USB host controller 31 and the USB device communicate with each other. Through this communication, the quasi-USB host controller 31 acquires information on the type of the USB device (for example, device type and interface type) according to the USB communication protocol (step S11).

From the information on the device type and the interface type, it is possible to determine the type of the USB device, that is, whether the USB device is a specific device (USB mass storage in the present example) or another USB device (for example, a USB device other than USB storage such as keyboard, mouse, or printer A). Then, the control unit 23 determines whether the USB device connected to the first connector unit 11 is a predetermined device such as USB mass storage based on the information on the type of the USB device acquired in step S11 (step S12).

In this determination processing, when it is determined that the USB device connected to the first connector unit 11 is different from a predetermined device such as USB mass storage (NO in S12), the quasi-USB host controller 31 brings the first switch unit 21 and the second switch unit 22 into a first connection state (step S13). This first connection state is a state in which the first connector unit 11 and the second connector unit 12 are electrically connected in a direct manner. Specifically, the movable contact 21_1 of the first switch unit 21 is connected to the fixed contact 21_2, and the movable contact 22_1 of the second switch unit 22 is connected to the fixed contact 22_2.

When determining in step S12 that the USB device connected to the first connector unit 11 is a predetermined device, for example, USB mass storage (YES in S12), the quasi-USB device 33 connects the first connector unit 11 and the second connector unit 12 to the control unit 23 by switching control of the first switch unit 21 and the second switch unit 22 (step S14), and then waits for reception of a read command from the USB host controller 70 (step S15). Upon reception of the read command (YES in S15), the quasi-USB device 33 transfers the read command to the quasi-USB host controller 31 (step S16).

Upon reception of the read command, the quasi-USB host controller 31 reads the file from the USB mass storage (step S17), and transfers the read file to the device-side area 41 and the management terminal 50 (step S18). Then, the quasi-USB host controller 31 waits for the result of the virus check in the virus check engine unit 51 transmitted from the management terminal 50 (step S19).

Next, the processing by the management terminal 50 will be described with reference to the flowchart of FIG. 5. In the management terminal 50, the file check function unit 53 waits for the file transmitted from the USB relay device 10 (step S31), and upon reception of the file (YES in S31), the file check function unit 53 transfers the received file to the virus check engine unit 51 (step S32). Upon reception of this file, the virus check engine unit 51 checks whether a virus exists in the file (step S33) and determines the check result (step S34).

In the check result determination processing in step S34, when it is determined that there is no virus, that is, when the check result is OK, the file check function unit 53 records the check history information of the result: OK in the file check history database 54 (step S35). In addition, the file check function unit 53 transmits the result: OK to the USB relay device 10 (step S36).

On the other hand, in the check result determination processing in step S34, when it is determined that there is a virus, that is, when the check result is NG, the file check function unit 53 records the check history information of the result: NG in the file check history database 54 (step S37). Further, the file check function unit 53 registers the specimen (file) and the check result in the specimen isolation history database 55 (step S38), and then transmits the result: NG to the USB relay device 10 (step S39).

The processing by the USB relay device 10 will be described again with reference to the flowchart of FIG. 4. In step S19, when the result of the virus check in the virus check engine unit 51 of the management terminal 50 is OK, the quasi-USB host controller 31 issues a file copy command to the device-side area 41 (step S20). Upon reception of this command, the device-side area 41 transfers the file to the USB host controller 70 via the controller-side area 42 and the quasi-USB device 33 in this order under the control of the quasi-USB host controller 31 (step S21).

On the other hand, in step S19, when the result of the virus check in the virus check engine unit 51 of the management terminal 50 is NG, the quasi-USB host controller 31 transfers an error response to the USB host controller 70 via the quasi-USB device 33 (step S22). In addition, the quasi-USB host controller 31 issues a file discard command to the device-side area 41 to discard the file in the device-side area 41 (step S23).

Then, the quasi-USB host controller 31 performs switching control of the first switch unit 21 and the second switch unit 22 (step S24). By this switching control, the movable contact 21_1 of the first switch unit 21 is connected to the fixed contact 21_3, and the movable contact 22_1 of the second switch unit 22 is connected to the fixed contact 22_2. That is, the disconnection state described above is established.

Next, the quasi-USB host controller 31 notifies the user of disconnection of the first connector unit 11 and the second connector unit 12 from the control unit 23 by turning on the LED of the light emitting unit 13, for example, and outputting a notification sound from the speaker of the notification unit 14, for example (step S25).

In this case, in this case, the LED of the light emitting unit 13 is turned on. However, the notification method is not limited to this and the light emitting unit may blink in a specific pattern. Further, the notification sound is output from the speaker of the notification unit 14. However, the notification method is not limited to this but the buzzer may be sounded. The notification may not be necessarily made to the user by both sound and light but the notification may be made by either one. The same thing is applicable to the following examples.

At the Time of Writing a File to USB Mass Storage

Next, the processing at the time of writing a file to the USB mass storage will be described with reference to the flowchart illustrated in FIG. 6.

Figure 6:
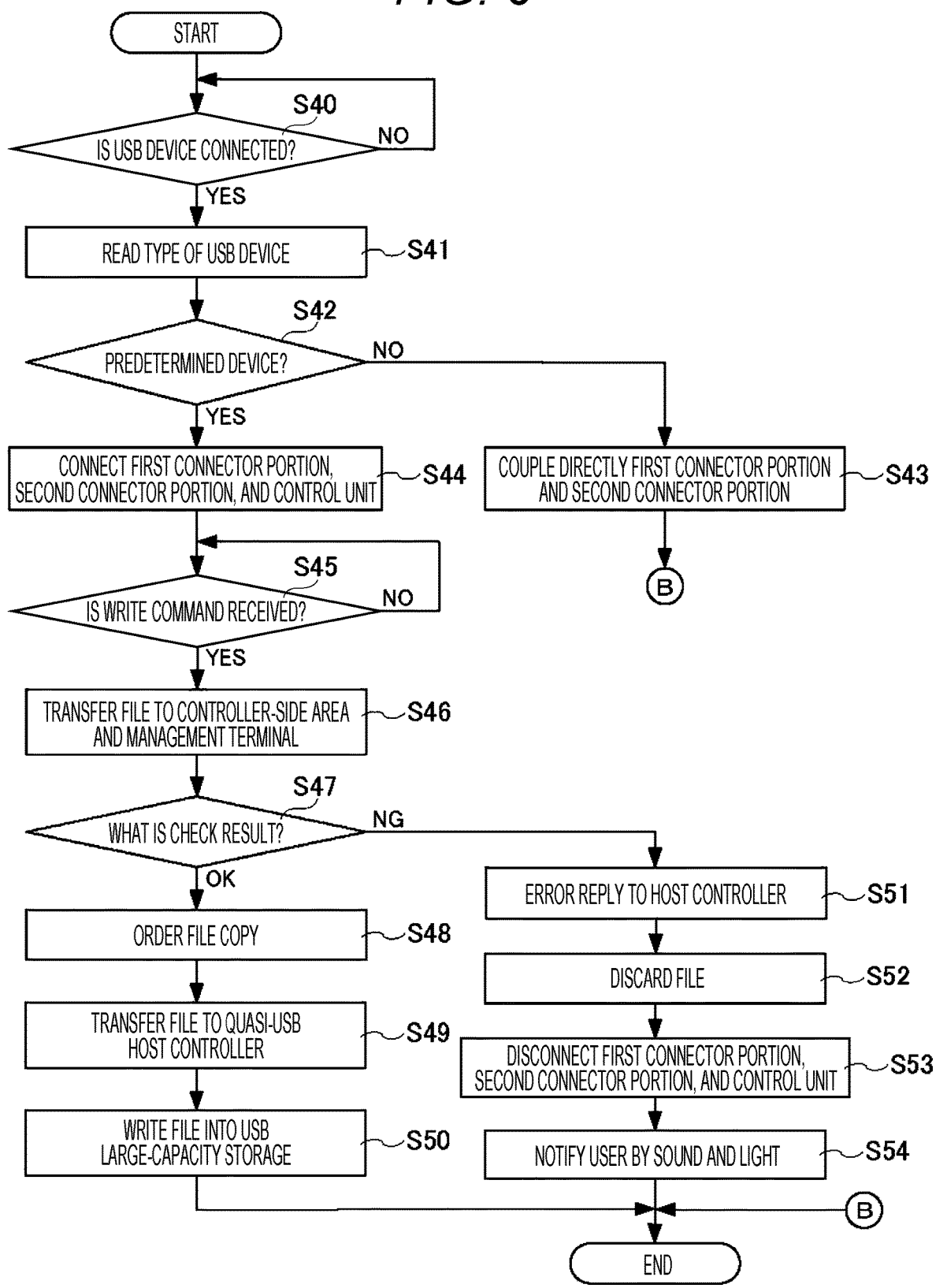
FIG. 6 is an example of a flowchart illustrating an example of processing by the USB relay device at the time of writing a file to the USB mass storage.

FIG. 6 is an example of a flowchart illustrating an example of processing by the USB relay device 10 at the time of writing a file to the USB mass storage. This processing is executed under the control of functional parts of the control unit 23 in the USB relay device 10. The processing by the management terminal 50 at the time of writing a file from the USB mass storage is basically the same as the example of processing by the management terminal 50 at the time of reading a file from the USB mass storage illustrated in the flowchart of FIG. 5.

In the flowchart of FIG. 6, steps S40 to S43 are the same as steps S10 to S13 illustrated in the flowchart of FIG. 4. At the time of writing a file to the USB mass storage, the USB host controller 70 transfers a write command and the file.

When the USB device connected to the first connector unit 11 is a predetermined device (YES in S42), the quasi-USB device 33 performs switching control of the first switch unit 21 and the second switch unit 22 to connect the first connector unit 11 and the second connector unit 12 to the control unit 23 (step S44). Then, the quasi-USB device 33 waits for a write command from the USB host controller 70 (step S45).

Upon reception of the write command (YES in S45), the quasi-USB device 33 transfers the file acquired from the USB host controller 70 to the controller-side area 42 and the management terminal 50 (step S46). Then, the quasi-USB device 33 waits for the result of the virus check in the virus check engine unit 51 transmitted from the management terminal 50 (step S47).

The virus check in the virus check engine unit 51 is the same as that in the case of reading a file from the USB mass storage described above with reference to the flowchart of FIG. 5. That is, when the virus check result indicates that there is no virus (the check result is OK), the file check function unit 53 records the check history information of the result: OK in the file check history database 54. When the virus check result indicates that there is a virus (the check result is NG), the file check function unit 53 records the check history information of the result: NG in the file check history database 54. Further, the file check function unit 53 registers the specimen (file) and the check result in the specimen isolation history database 55.

In step S47, when the result of the virus check in the virus check engine unit 51 of the management terminal is OK, the quasi-USB device 33 issues a file copy command to the controller-side area 42 (step S48). Upon reception of this command, the controller-side area 42 transfers the file to the quasi-USB host controller 31 via the device-side area 41 under the control of the quasi-USB device 33 (step S49). Then, the quasi-USB host controller 31 writes the transferred file to the USB mass storage (step S50).

On the other hand, in step S47, when the result of the virus check in the virus check engine unit 51 of the management terminal 50 is NG, the quasi-USB device 33 transfers an error response to the USB host controller 70 (step S51). Further, the quasi-USB device 33 issues a file discard command to the controller-side area 42 to discard the file in the controller-side area 42 (step S52).

Then, the quasi-USB device 33 brings the first switch unit 21 and the second switch unit 22 into the second connection state in which the first connector unit 11 and the second connector unit 12 are disconnected from the control unit 23 (step S53). Next, the quasi-USB device 33 notifies the user of disconnection of the first connector unit 11 and the second connector unit 12 from the control unit 23 by turning on the light emitting unit 13 and outputting a notification sound from the notification unit 14 (step S54).

The virus detection system 1 according to the present embodiment described above has the USB relay device 10 that can switch the connection state (path) between the first connector unit 11 to which the USB client 60 is connected and the second connector unit 12 connected to the USB host controller 70. As a result, the first connector unit 11 and the second connector unit 12 can be selectively connected directly, thereby supporting not only the use of the USB mass storage but also the use of other USB devices such as keyboard, mouse, and printer.

The virus detection system 1 according to the present embodiment transfers a file to be transferred between the USB client 60 and the USB host controller 70 to the external management terminal 50 via the USB relay device 10 so that the virus check engine unit 51 can detect any virus (threat) in the file. Then, based on the result of the check by the virus check engine unit 51, switching control of the connection state (path) between the first connector unit 11 and the second connector unit 12 is performed to prevent the transfer of the virus-detected file.

In this way, according to the configuration in which a virus check of files is performed by the virus check engine unit 51 provided in the external management terminal 50, it is possible to perform a virus check only on files exchanged between the USB client and the USB host controller without impairing the versatility of the USB device. Even if a pattern file with virus information becomes enlarged, the external management terminal 50 can cope with this enlargement. Further, when it is to be checked whether there is match/mismatch with an enormous size pattern file for virus check, a large processing capacity is required. However, the external management terminal 50 has a large processing capacity.

Modification Example

The present invention is not limited to the foregoing embodiment but includes various modification examples. For example, the foregoing embodiment is described in detail for easy comprehension of the present invention and is not necessarily limited to the one including all the components described above. For example, some or all of the foregoing components and functional units may be implemented hardware-wise by designing an integrated circuit, for example. In the example described above, the light emitting unit 13 and the notification unit 14 are provided as means for notifying the user that a virus has been detected. However, both the light emitting unit 13 and the notification unit 14 may not be necessarily provided but either one of them may be provided.

In the above-described example, as an implementation form of the functional units including the virus check engine unit 51, the file check function unit 53, the file check history database 54, and the specimen isolation history database 55, the function units are implemented on one hardware/operating system (OS), but the implementation form is not limited to this. That is, as other implementation forms, the functional units may be implemented on a plurality of pieces of hardware/OSs. Hereinafter, such implementation forms will be described as a first modification example and a second modification example.

First Modification Example

FIG. 7 is an example of a block diagram schematically illustrating a system configuration of a virus detection system according to an implementation form of the first modification example. As illustrated in FIG. 7, the implementation form of first modification example is an example in which two devices 100 and 200 are provided as a plurality of pieces of hardware/OSs. One device 100 is provided with a communication interface 52, a file check function unit 53, a file check history database 54, and a specimen isolation history database 55. The other device 200 is provided with a virus check engine unit 51 and is prepared as a dedicated appliance for virus check.

Second Modification Example

FIG. 8 is an example of a block diagram schematically illustrating a system configuration of a virus detection system according to an implementation of the second modification example. As illustrated in FIG. 8, the implementation form of second modification example is an example in which three devices 100, 200, and 300 are provided as a plurality of pieces of hardware/OSs. This implementation form of the second modification example is the same as the implementation form of the first modification example in that the device 200 is prepared as a dedicated appliance for virus check. In the implementation form of the second modification example, similarly to the virus check engine unit 51, the file check history database 54 and the specimen isolation history database 55 are provided in the device 300 different from the device 100.

REFERENCE SIGNS LIST

1 virus detection system
10 USB relay device
11 first connector unit
12 second connector unit
13 light emitting unit
14 notification unit
15 communication interface
21 first switch unit
22 second switch unit
23 control unit
31 quasi-USB host controller
32 storage area
33 quasi-USB device
34 external communication unit
50 management terminal
51 virus check engine unit
52 communication interface
53 file check function unit
54 file check history database
55 specimen isolation history database
60 USB client
70 USB host controller

The invention claimed is:

1. A virus detection system comprising;
a USB relay device having a control unit and a connection switching unit configured to switch a connection state between a first connector unit to which a USB client is connected and a second connector unit connected to a USB host controller,
a virus check engine unit that performs virus check of a file acquired from the USB client or the USB host controller via the USB relay device,
wherein the connection switching unit selectively switches among a first connection state in which the first connector unit and the second connector unit are electrically connected, a second connection state in which the control unit of the USB relay device is electrically connected to the first connector unit and the second connector unit, and a disconnection state in which the first connector unit and the second connector unit are not electrically connected,
wherein when the USB client connected to the first connector unit is a USB device other than USB storage, the connection switching unit sets the first connection state in which the first connector unit and the second connector unit are electrically connected,
wherein when the USB client connected to the first connector unit is the USB storage, the connection switching unit sets the second connection state in which the control unit is electrically connected to the first connector unit and the second connector unit,
wherein upon receiving a read command for a file, the virus check engine unit performs a virus check on the file and if no virus is found, the USB relay device transfers the file to the second connector unit,
wherein if a virus is found during the virus check, the USB relay device does not transfer the file to the connector unit and the connection switching unit sets the disconnection state in which the first connector unit and the second connector unit are not electrically connected,
wherein the connection switching unit has a first switch unit having a movable contact connected to the first connector unit and a second switch unit having a movable contact connected to the second connector unit, and
wherein one fixed contact of the first switch unit and one fixed contact of the second switch unit are connected to each other, the other fixed contact of the first switch unit and the other fixed contact of the second switch unit are each connected to the control unit.

2. The virus detection system using the USB relay device according to claim 1, comprising
a file check history database for recording check history information of the virus check engine unit.

3. The virus detection system using the USB relay device according to claim 1, comprising
a specimen isolation history database for recording the file and result of virus check of the file.

4. A virus detection method in a virus detection system that uses a USB relay device having a control unit and a connection switching unit configured to switch a connection state between a first connector unit to which a USB client is connected and a second connector unit connected to a USB host controller, the method comprising:
selectively switching, by the connection switching unit, among a first connection state in which the first connector unit and the second connector unit are electrically connected, a second connection state in which the control unit of the USB relay device is electrically connected to the first connector unit and the second connector unit, and a disconnection state in which the first connector unit and the second connector unit are not electrically connected,
when the USB client connected to the first connector unit is a USB device other than USB storage, setting, by the connection switching unit, the first connection state in which the first connector unit and the second connector unit are electrically connected,
when the USB client connected to the first connector unit is the USB storage, setting, by the connection switching unit, the second connection state in which the control unit is electrically connected to the first connector unit and the second connector unit, upon receiving a read command for a file, performing a virus check on the file and if no virus is found, transferring the file to the second connector unit, if a virus is found during the virus check, not transferring the file to the connector unit and setting, by the connection switching unit, the disconnection state in which the first connector unit and the second connector unit are not electrically connected, wherein the connection switching unit has a first switch unit having a movable contact connected to the first connector unit and a second switch unit having a movable contact connected to the second connector unit, and wherein one fixed contact of the first switch unit and one fixed contact of the second switch unit are connected to each other, the other fixed contact of the first switch unit and the other fixed contact of the second switch unit are each connected to the control unit.

* * * * *